United States Patent
Bogineni et al.

(10) Patent No.: US 11,888,699 B1
(45) Date of Patent: Jan. 30, 2024

(54) METHOD AND SYSTEM FOR HYBRID NETWORK SLICING

(71) Applicant: Verizon Patent and Licensing Inc., Basking Ridge, NJ (US)

(72) Inventors: Kalyani Bogineni, Irving, TX (US); Sudhakar Reddy Patil, Flower Mound, TX (US); Matthew W. Nelson, Pleasanton, CA (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/937,031

(22) Filed: Sep. 30, 2022

(51) Int. Cl.
| | |
|---|---|
| H04L 41/122 | (2022.01) |
| H04L 43/55 | (2022.01) |
| H04L 41/14 | (2022.01) |
| H04L 41/0806 | (2022.01) |
| H04L 41/40 | (2022.01) |
| H04W 16/10 | (2009.01) |
| H04W 72/50 | (2023.01) |
| H04W 28/18 | (2009.01) |
| H04L 41/0895 | (2022.01) |
| H04W 76/10 | (2018.01) |

(52) U.S. Cl.
CPC ........ *H04L 41/122* (2022.05); *H04L 41/0806* (2013.01); *H04L 41/0895* (2022.05); *H04L 41/145* (2013.01); *H04L 41/40* (2022.05); *H04L 43/55* (2022.05); *H04W 16/10* (2013.01); *H04W 28/18* (2013.01); *H04W 72/50* (2023.01); *H04W 76/10* (2018.02)

(58) Field of Classification Search
CPC ....... H04L 41/08; H04L 41/0893–0895; H04L 41/145–147; H04L 41/50–5025; H04L 41/00; H04L 41/12–122; H04L 41/40; H04W 16/02–12; H04W 28/16–26; H04W 48/18; H04W 72/50–563; H04W 76/10–16

See application file for complete search history.

(56) References Cited

U.S. PATENT DOCUMENTS

| | | | |
|---|---|---|---|
| 10,172,009 B1* | 1/2019 | Altay | H04L 67/12 |
| 10,791,040 B2* | 9/2020 | Vrzic | H04L 47/2408 |
| 10,848,393 B2* | 11/2020 | Xu | H04W 48/18 |

(Continued)

OTHER PUBLICATIONS

Raza, Muhammad Rehan, et al. "Machine learning methods for slice admission in 5g networks." 2019 24th OptoElectronics and Communications Conference (OECC) and 2019 International Conference on Photonics in Switching and Computing (PSC). IEEE, 2019.*

*Primary Examiner* — Brendan Y Higa

(57) ABSTRACT

A method, a network device, and a non-transitory computer-readable storage medium are described in relation to a hybrid network slicing service. The hybrid network slicing service may enable the initial configuration of a network slice according to network slice requests that may include customized and user-specified network performance criteria. The hybrid network slicing service may enable network slice requests to specify selection of network resources and use/availability based on entity-based criteria including end device and/or application specific associations. The hybrid network slicing service may optimize network slice configurations and generate network slice templates.

20 Claims, 8 Drawing Sheets

(56) References Cited

U.S. PATENT DOCUMENTS

| | | | | |
|---|---|---|---|---|
| 10,880,176 | B2* | 12/2020 | Zhang | H04L 41/40 |
| 11,115,920 | B1* | 9/2021 | Seetharaman | H04W 36/14 |
| 11,252,655 | B1* | 2/2022 | Gupta | H04L 67/02 |
| 11,310,733 | B1* | 4/2022 | Gupta | H04W 28/0268 |
| 11,412,415 | B2* | 8/2022 | Asawa | H04L 41/40 |
| 11,444,835 | B2* | 9/2022 | Seetharaman | H04W 28/0268 |
| 11,563,652 | B2* | 1/2023 | Seetharaman | H04L 41/0895 |
| 11,678,259 | B2* | 6/2023 | Lou | H04W 74/0833 370/329 |
| 2018/0270073 | A1* | 9/2018 | Senarath | H04L 41/0894 |
| 2019/0053104 | A1* | 2/2019 | Qiao | H04M 15/66 |
| 2019/0174320 | A1* | 6/2019 | Kodaypak | H04L 41/00 |
| 2019/0174322 | A1* | 6/2019 | Deviprasad | H04L 41/0853 |
| 2020/0014589 | A1* | 1/2020 | Xu | H04L 41/122 |
| 2020/0154292 | A1* | 5/2020 | Bor-Yaliniz | H04W 24/02 |
| 2020/0177460 | A1* | 6/2020 | Xu | H04L 41/5054 |
| 2020/0178122 | A1* | 6/2020 | Xu | H04L 41/0806 |
| 2020/0178125 | A1* | 6/2020 | Dowlatkhah | H04W 24/02 |
| 2020/0196155 | A1* | 6/2020 | Bogineni | H04L 41/0823 |
| 2020/0221346 | A1* | 7/2020 | Park | H04W 48/06 |
| 2020/0313969 | A1* | 10/2020 | Li | H04L 41/0806 |
| 2020/0366546 | A1* | 11/2020 | Kommula | H04L 47/2483 |
| 2021/0051070 | A1* | 2/2021 | Akman | H04L 41/5019 |
| 2021/0204198 | A1* | 7/2021 | Xin | H04W 28/0268 |
| 2022/0038956 | A1* | 2/2022 | Stauffer | H04L 45/24 |
| 2022/0191777 | A1* | 6/2022 | Corston-Petrie | H04W 76/12 |
| 2022/0201556 | A1* | 6/2022 | Yang | H04W 48/18 |
| 2022/0294709 | A1* | 9/2022 | Mannweiler | H04L 41/5048 |
| 2022/0345995 | A1* | 10/2022 | Gupta | H04W 24/02 |
| 2022/0353151 | A1* | 11/2022 | Yu | H04W 24/02 |
| 2023/0006889 | A1* | 1/2023 | Thyagaturu | H04L 41/5054 |
| 2023/0032088 | A1* | 2/2023 | Goswami | H04W 16/18 |
| 2023/0284127 | A1* | 9/2023 | Gautam | H04L 41/5048 370/328 |

* cited by examiner

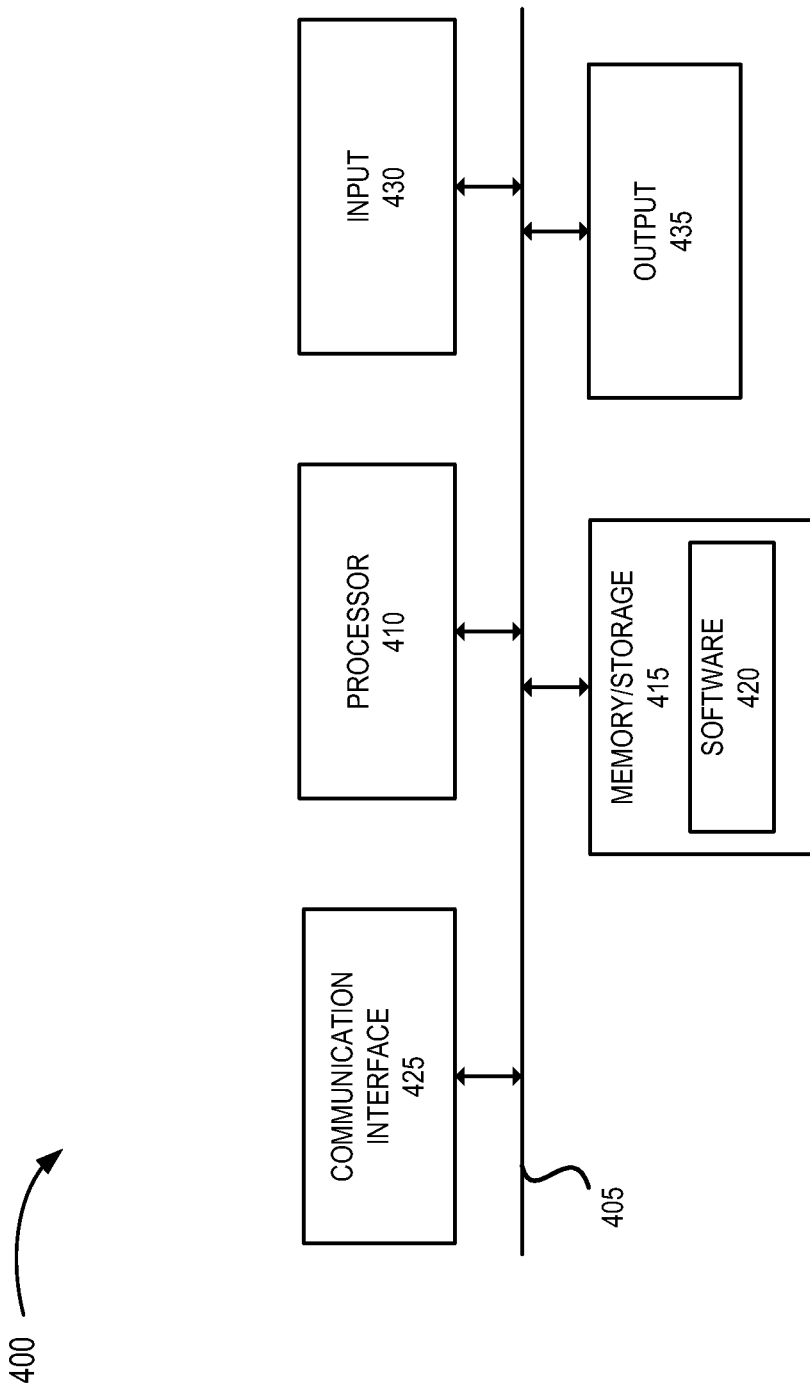

METHOD AND SYSTEM FOR HYBRID NETWORK SLICING

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIG. 4 is a diagram illustrating exemplary components of a device that may correspond to one or more of the devices illustrated and described herein.

DETAILED DESCRIPTION

Figure 1:
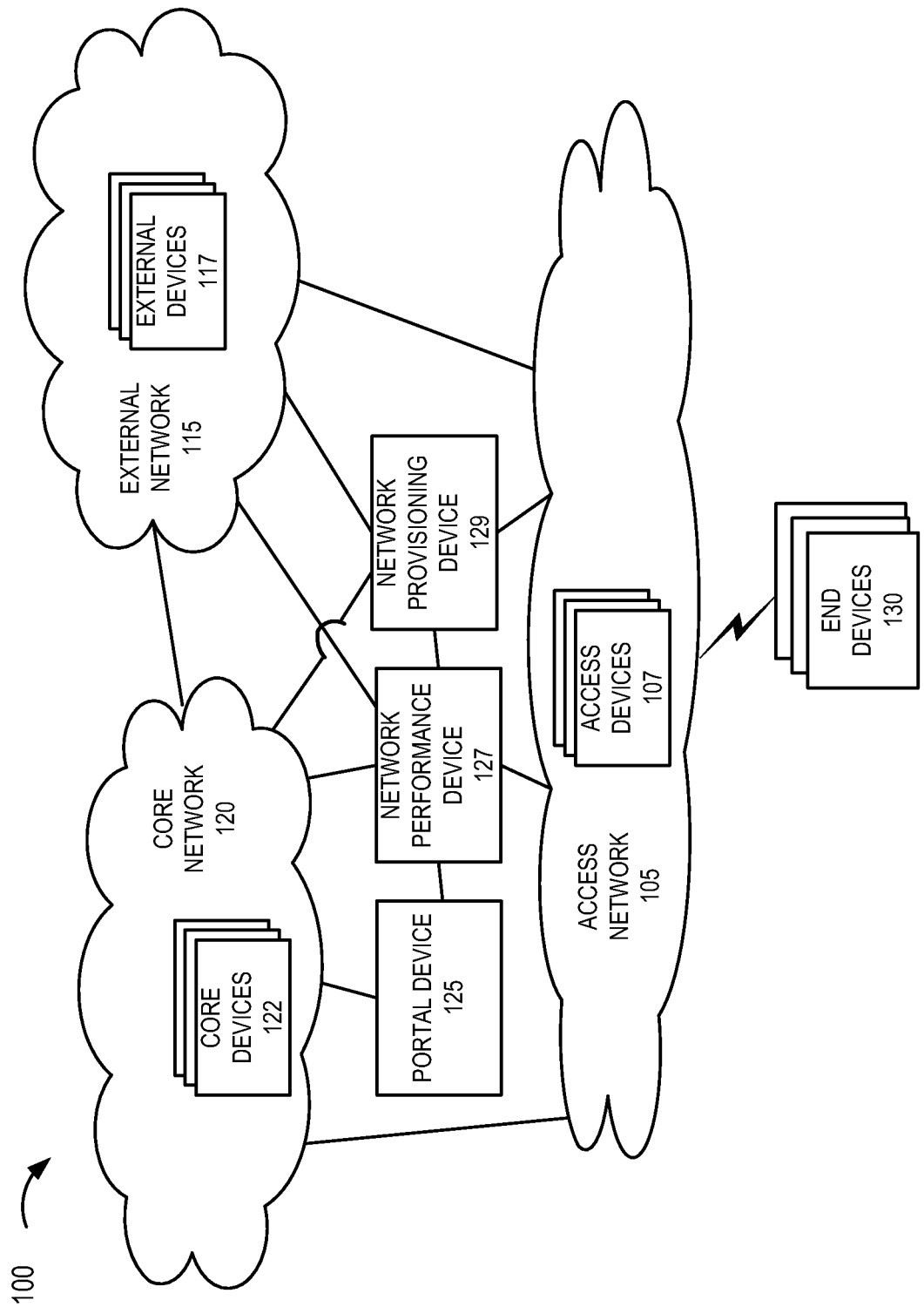
FIG. 1 is a diagram illustrating an exemplary environment in which an exemplary embodiment of a hybrid network slicing service may be implemented.

The following detailed description refers to the accompanying drawings. The same reference numbers in different drawings may identify the same or similar elements. Also, the following detailed description does not limit the invention.

Current network slicing models are based on two types of deployment architectures. The first type is a network slice that may be configured based on an application and/or traffic category, such as ultra-reliable low latency communication (URLLC), massive machine-type communication (mMTC), enhanced mobile broadband (eMBB), and so forth. The second type of a network slice may be configured based on end device categories, such as an Internet of Things (IoT) category, a mobile virtual network operator (MVNO) category, a mobile broadband (MBB) category, a smartphone category, and so forth. According to these deployments, a network operator or another entity may make available a network slice to users.

These current network slice architectures, however, assume equal ease in partitioning of all resources, such as computational resources, radio resources, topological resources, storage resources, core network resources, transmitter/receiver resources, bandwidth resources, communication link resources, and so forth. Additionally, these types of network slice architectures assume that the partitioning scheme is loss-less, efficient, and without any negative consequences. However, given the dynamism of resources and sharing of network resources vis-à-vis satisfying service level agreement (SLA) requirements, typically network systems may be unable to provision and/or maintain SLA requirements associated with network slices across multiple networks and/or end-to-end.

Additionally, the current network slice architectures do not allow for users or other types of entities to request application-specific network slices either prospectively or on-demand. As an example, a software developer or another type of entity may wish to have a network slice available to accommodate a new mobile application under development or to become publicly available to users. The entity may be unable to specify SLA requirements to a network operator, for example, so that network slices may be prospectively and suitably configured and available to accommodate the SLA requirements. According to another example, an end device may include a newly installed and newly available (e.g., to the public, customers, users, subscribers, etc.) application. Subsequent to the installation, the end device and/or the newly installed application cannot, on-demand, request from a network, to configure a network slice that may accommodate SLA requirements of the application in which the SLA requirements may be unique relative to current network slices offered and/or available by the network.

According to exemplary embodiments, a hybrid network slicing service is described. The hybrid network slicing service may enable users to request a network slice that may not otherwise be available and/or offered by a network. According to an exemplary embodiment, the hybrid network slicing service may include a portal that allows the user to specify parameters and values pertaining to the requested network slice. For example, the parameters and values may include SLA requirements. As an example, the SLA requirements may specify one or multiple performance metrics and values, such as those relating to latency, throughput, reliability, and/or another type of performance metric and value, as described herein. Additionally, for example, the network slice request may specify other types of parameters and/or values relating to network resources (e.g., dedicated, shared, etc.), prioritization, policies, and/or other types of criteria, as described herein.

According to an exemplary embodiment, network slices may be provisioned by domain. A domain may be associated with one or multiple entities. For example, a domain may be associated with a third party or a network operator and a third party. By way of further example, the hybrid network slicing service may provision and configure domain-specific network slices that may be offered and/or available to domain specific end devices and/or applications. For example, the network slice may be application-specific (e.g., a single end device application versus a category of an end device application). Such mapping(s) may be based on an association of an entity with the end devices, subscriber identity modules (SIMS) or the like (e.g., cards), a user, and/or other context (e.g., location, etc.) pertaining to such elements, as described herein. The hybrid network slicing service may also "mix and match" rules and/or policies to make a network slice available to end users. The domain-specific network slices may be provisioned with domain-specific network resources. For example, a network operator may allocate and/or reserve RAN and core network resources to an entity. A domain may have network slices independent of other domains. According to various exemplary embodiments, the network slice may be statistically configured and maintained with the same resource levels for its lifetime or dynamically with on-demand setup and configured with adaptive resource levels.

According to an exemplary embodiment, the hybrid network slicing service may include an artificial intelligence and/or machine learning (AI/ML) device configured to receive a network slice request, as described herein, and in response, test and learn a configuration for the requested network slice. As an example, the AI/ML device may receive a network slice request from the software developer or another entity as previously described according to an exemplary scenario. The AI/ML device may learn and optimize a configuration for the network slice in the network, as described herein. According to another exemplary embodiment, the AI/ML device may provision and configure, on-demand, the network slice. For example, the AI/ML device may receive a network slice from the end user that installed a new mobile application that has newly become available as previously described according to an exemplary scenario. The AI/ML device may provision and configure a network slice that may not have been previously available and/or offered by the network.

According to an exemplary embodiment, the hybrid network slicing service may provide network slice configuration information to a network provisioning system. The network provisioning system may provision a network slice according to the network slice configuration information. According to an exemplary embodiment, the hybrid network slicing service may include the provisioning of radio access network (RAN) resources, core network resources, another type of network (e.g., a data network (DN), an external network relative to a RAN and/or a core network, an application layer network that hosts an application service, an intermediary network relative to end-to-end resources, etc.), end device resources, application server host resources, and the like. According to an exemplary embodiment, the mapping of an application service to a network operator-and-third party specific network slice may be done independently in each domain of a network.

According to an exemplary embodiment, the hybrid network slicing service may obtain current state information and use such information to learn and optimize the provisioning of the network slice, as described herein. For example, the AI/ML device may obtain and evaluate current state information associated with a network and the network slice, determine a network performance, and modify or not modify the network slice configuration, as described herein.

In view of the foregoing, the hybrid network slicing service may improve network slice provisioning and afford a flexibility and diversification of network slices available to users. Further, the hybrid network slicing service may improve the management of network performance at a network element or geographic service area level based on AI/ML models and the feedback system, as described herein.

FIG. 1 is a diagram illustrating an exemplary environment 100 in which an exemplary embodiment of a hybrid network slicing service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes a portal device 125, a network performance device 127, a network provisioning device 129, and end devices 130 (also referred to individually or generally as "end device 130").

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary. For example, two or more of portal device 125, network performance device 127, and network provisioning device 129 may be combined in whole or in part as a single network device.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the hybrid network slicing service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a header, a parameter, or another form of a data instance) between network devices and the hybrid network slicing service logic of the network device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network including an Evolved Packet Core (EPC) network and/or an NG core (NGC) network (not illustrated), or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (ColVIP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved Long Term Evolution (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector/zone, carrier, and/or other configurable level. For example, the sub-sector/zone level may include multiple divisions of a geographic area of a sector relative to access device 107. By way of further example, the sector may be divided based on proximity to the antenna of access device 107 (e.g., near, mid, far) and/or another criterion. According to another example, radio coverage of a location may be divided based on a Military Grid Reference System (MGRS) or another type of grid system to produce geo-bins. The size and/or shape of each geo-bin may be configurable. The size and/or the shape of a geo-bin may depend on the types of access device 107 (e.g., eNB versus gNB), attributes of access device 107 (e.g., antenna configuration, radio frequency band of beam, etc.), and/or other factors (e.g., terrain of the radio covered locale).

According to an exemplary embodiment, at least some of access devices 107 include logic of the hybrid network slicing service, as described herein. For example, access device 107 may transmit and receive messages pertaining to the hybrid network slicing service, as described herein. For example, access device 107 may provide state information pertaining to access device 107 and other RAN-based network elements (e.g., cell, sector, sub-sector/zone, network slice segment, radio bearer, QoS flow, PDU session, protocol layer, etc.) to network performance device 127. Additionally, for example, access device 107 may be provisioned by network provisioning device 129, as described herein.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the hybrid network slicing service, as described herein. For example, external device 117 may transmit and receive messages pertaining to the hybrid network slicing service, as described herein. For example, external device 117 may provide state information pertaining to external device 117 and other external network-based network elements (e.g., container, virtual machine, application service, network slice segment, etc.) to network performance device 127. Additionally, for example, external device 117 may be provisioned by network provisioning device 129, as described herein.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the hybrid network slicing service, as described herein. For example, core device 122 may transmit and receive messages pertaining to the hybrid network slicing service, as described herein. For example, core device 122 may provide state information pertaining to core device 122 and other core-based network elements (e.g., QoS flow, network slice segment, session, protocol layer, etc.) to network performance device 127. Additionally, for example, access device 107 may be provisioned by network provisioning device 129, as described herein.

Portal device 125 may include a network device that includes logic of the hybrid network slicing service, as described herein. Although portal device 125 is depicted outside of access network 105, external network 115, and core network 120, such an illustration is exemplary. According to other exemplary implementations, portal device 125 may reside in one or multiple networks depicted and described herein. Additionally, portal device 125 may be implemented in a centralized, distributed, and/or another type of network and/or computing architecture as a network device or system, as described herein.

According to an exemplary embodiment, portal device 125 may be configured to receive a network slice request and provide the network slice request to network performance device 127, as described herein. Portal device 125 may include a graphical user interface (GUI) that allows a user to generate the network slice request. For example, the GUI may enable the user to select and specify SLA requirements (e.g., performance metric parameters and values) and/or other types of criteria (e.g., domain, etc.), as described herein, that may be indicative of a characteristic attributable to the requested network slice. According to various exemplary embodiments, the network slice request may be implemented as a standalone message, a message associated with and/or included in a message of a network procedure (e.g., a PDU session establishment procedure, a network attachment procedure, etc.), and/or a proprietary message. According to some exemplary embodiments, network slice request information may also be provided to test devices, as described herein.

Network performance device 127 may include a network device that includes logic of the hybrid network slicing service, as described herein. Although network performance device 127 is depicted outside of access network 105, external network 115, and core network 120, such an illustration is exemplary. According to other exemplary implementations, network performance device 127 may reside in one or multiple networks depicted and described herein. Additionally, network performance device 127 may be implemented in a centralized, distributed, and/or another type of network and/or computing architecture as a network device or system, as described herein.

According to an exemplary embodiment, network performance device 127 may include AI/ML logic that calculates network slice configuration information. According to an exemplary embodiment, network performance device 127 may calculate the network slice configuration information based on the network slice request information, current analytics information, network topology information, network state information, and/or test performance metric parameter values stemming from test traffic, as described herein.

According to an exemplary embodiment, the network slice request information may include performance metric parameters and values, as described herein. The network slice request may include other types of parameters and/or values. For example, the network slice request may include an identifier that identifies a domain, as described. The domain may also correlate to other aspects of a network slice, such as the network resources that may be used (e.g., dedicated, shared, location of resources, etc.) to provision the network slice, resource prioritization, policies relating to various aspects of the network slice, such as domain specific end devices and/or applications, service level support, lifecycle management regarding virtualization, an identifier that may identify an application and/or a service to which the performance metric parameters and values may pertain, traffic flow characteristics associated with the application and/or service (e.g., continuous, bursty, periodic, aperiodic, amount of data, length of time pertaining to a transmission or a reception of data, etc.), execution behavior of the application and/or service (e.g., background application, foreground application, runs intermittently, runs constantly, minimal end device resource usage, extensive end device resource usage, etc.), and/or other types of configurable criteria that may be of relevance for provisioning of the network slice, satisfying performance metrics/SLA requirements during an application session via the network slice, and/or learning/optimizing a configuration for the network slice.

According to an exemplary embodiment, network performance device 127 may obtain current analytics information. For example, the current analytics information may include performance metric parameters and values relating to network elements and/or geographic areas within which a service is provided. According to an exemplary embodiment, network performance device 127 may obtain the current analytics information from an NWDAF. According to other exemplary embodiments, network performance device 127 may obtain current analytics information from another type of device that may provide real-time analytics data (e.g., a SON device). According to some exemplary embodiments, network performance device 127 may obtain current analytics information from access device 107, core device 122, and/or external device 117. Network performance device 127 may collect data, which may be statistical or real-time streaming from various devices, such as the NWDAF, a SON, or another type of network device.

According to various exemplary embodiments, the performance metric parameters and values may include key performance indicators (KPIs), Quality of Service (QoS) parameters and values, Quality of Experience (QoE) parameters and values, SLA parameters and values, and/or Mean Opinion Score (MOS) parameters and values. A performance metric value may be implemented as a single value (e.g., X) or a range of values (e.g., X to Y). The performance metric value may also be associated with a time period (e.g., seconds, hour(s), day(s), and/or another time period), may indicate an average value, a mean value, and/or another statistical value. By way of further example, the performance metric information may relate to the performance associated with user sessions, connections, channels, messaging, a network procedure (e.g., attachment, handover, session establishment, local breakout, dual connectivity, etc.), application services, and/or other types of metrics in relation to a network element and/or a geographic area associated with a service. The performance metric information may relate to user plane or user plane and control plane events or metrics. As an example, the performance metric information may include information relating to Radio Resource Control (RRC) setup failures, handover attempts, handover failures, radio bearer drops, uplink and/or downlink throughput, voice call drops, random access failures, data volume (e.g., maximum, minimum, etc.), latency, packet error, delay, bit rates (e.g., guaranteed, maximum, minimum, burst, etc.), jitter, retries, 5G QoS Class Identifiers (QCIs) and characteristics, and so forth.

According to an exemplary embodiment, network performance device 127 may obtain other types of data as a basis to calculate the network slice configuration information, as described herein. For example, network performance device 127 may store or have access to network topology information. The network topology information may indicate the type, number, and placement of access devices 107, external devices 117, and core devices 122. The network topology information may include network device identifiers, network slice identifiers, and/or other types of unique identifiers. The network topology information may indicate connectivity information pertaining to network devices and other types of network elements (e.g., logical, virtual, network slices, links, etc.) of a network. The network topology information may include information relating to components of access devices 107, such as antennas (e.g., height, number, type, gain, transmit loss, receive loss, receive signal, fade margin (e.g., thermal, effective, etc.), and other characteristics (e.g., carrier frequencies, frequency bands, cells, radio access technology (RAT), cell coverage, sector coverage, sub-sector/zone coverage) and configurations (e.g., CA, DC, CoMP, etc.). Similarly, the network topology information may include information relating to components of other types of network devices (e.g., core devices 122, external devices 117, etc.) and/or communication links.

Additionally, network performance device 127 may obtain network state information, which may relate to congestion levels, available network resource capacities, and so forth. The network state information may include current and/or predictive/prospective values. The network state information may also include information that relates to network slices (e.g., the proposed network slice under development/configuration and other network slices provisioned in the network), and other types of network paths, traffic, network devices, and so forth, associated with a network.

According to some exemplary embodiments, network performance device 127 may obtain performance metric parameters and value relating to test traffic that traverses the proposed network slice under configurational development. For example, a testing end device and a test server may generate uplink and/or downlink traffic, based on the network slice request information, such that performance metric parameters and values may be measured in relation to the proposed network slice during initial provisioning and learning towards optimizing a network slice configuration.

Network performance device 127 may calculate values and/or configuration information pertaining to the network slice, as described herein, based on a comparison of performance metric parameters and values (e.g., SLA requirements, etc., as specified in the network slice request) and current analytics information pertaining to the network slice. Based on a result of the comparison, network performance device 127 may determine whether a modification to the current network slice configuration is to be calculated. As an example, when the current analytics information satisfies or exceeds the expected performance metric/SLA requirement information, network performance device 127 may determine to not modify network resources and/or configurations associated with the network slice. Alternatively, network performance device 127 may determine to modify the allocation of network resources and/or configuration associated with the network slice when the current analytics information exceeds the expected performance metric/SLA requirement information. For example, network performance device 127 may reduce the allocation of resources and/or adjust a configuration associated with a network element of relevance to the network slice. Further for example, when the current analytics information fails to satisfy the expected performance metric/SLA requirement information, network performance device 127 may determine to modify network resources and/or configuration so as to satisfy or sustain the expected performance metric/SLA requirements. Network performance device 127 may make determinations regarding modification, in addition to a result of the comparison, but also based on policies and/or rules that may account for not only the expected performance metric parameters and values but also other information (e.g., historical information, etc.).

According to an exemplary embodiment, network performance device 127 may include AI/ML logic, as described herein, to calculate the modification to the current network slice configuration. The hybrid network slicing service may enable network performance device 127 to tune one or multiple network elements towards achieving and sustaining expected performance metrics associated with an SLA based on this feedback (e.g., negative or positive) system, as described herein.

According to an exemplary embodiment, network performance device 127 may provide the network slice configuration information to network provisioning device 129. The network slice configuration information may pertain to the network slice (e.g., end-to-end), a segment of the network slice, one or multiple network devices of the network slice, a geographic area associated with the network slice, and/or another type of network element, for example. According to various exemplary embodiments, network performance device 127 may be configured to calculate and provide the network slice configuration information according to a time schedule, or based on other criteria (e.g., reactively, proactively, etc.). Network performance device 127 may publish the network slice configuration information on a service bus, provide to third party devices of an application service layer network via a NEF and/or other types of network systems, such as an operations support system (OSS), a business support system (BSS), a network management system, an orchestrator, a radio intelligent controller (MC), virtualization management system, or the like.

Network provisioning device 129 may include a network device that includes logic of the hybrid network slicing service, as described herein. Although network provisioning device 129 is depicted outside of access network 105, external network 115, and core network 120, such an illustration is exemplary. According to other exemplary implementations, network provisioning device 129 may reside in one or multiple networks depicted and described herein. Additionally, network provisioning device 129 may be implemented in a centralized, distributed, and/or another type of network and/or computing architecture as a network device or system, as described herein. Network provisioning device 129 may be configured to provision the network slice, network elements of the network slice, and network resources external from the network slice (e.g., other network slices, networks, network paths, network devices, etc.) according to the network slice configuration information received from network performance device 127.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, end device 130 may include logic of the hybrid network slicing service, as described herein. For example, end device 130 may transmit and receive messages pertaining to the hybrid network slicing service, as described herein. For example, end device 130 may provide state information pertaining to end device 130 and other end device-based network elements (e.g., QoS flow, network slice segment, PDU session, protocol layer, application service, network slice, etc.) to network performance device 127. Additionally, for example, end device 130 may be provisioned by network provisioning device 129, as described herein.

Figure 2:
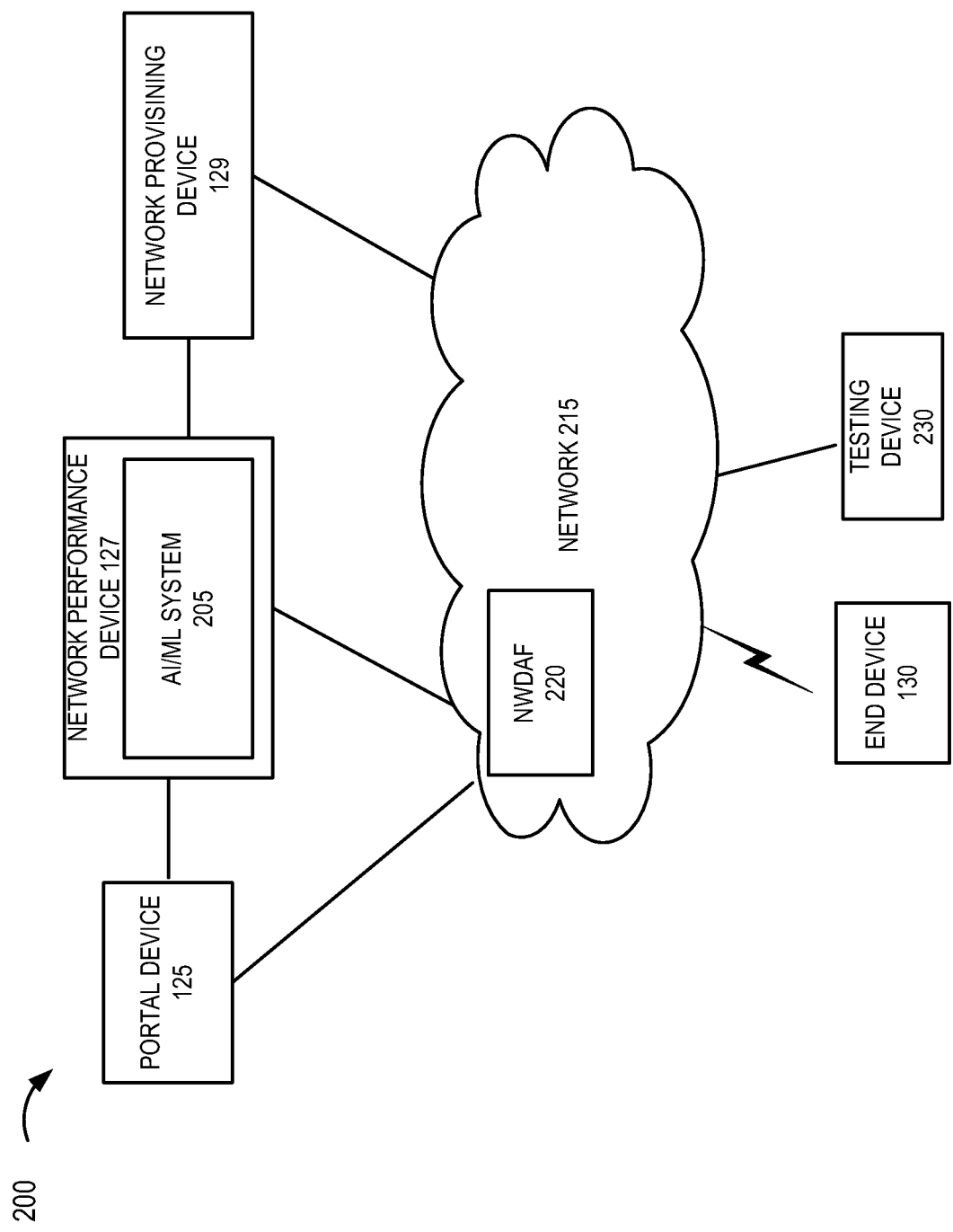
FIG. 2 is a diagram illustrating another exemplary environment in which an exemplary embodiment of the hybrid network slicing service may be implemented.

FIG. 2 is a diagram illustrating another exemplary environment 200 in which an exemplary embodiment of the hybrid network slicing service may be implemented. As illustrated, environment 200 may include portal device 125, network performance device 127, network provisioning device 129, a network 215, an NWDAF 220, a testing device 230, and end device 130. Similar to the description of environment 100, the number, type, and arrangement of network devices, end devices 130, communication links, and so forth, may be different in other embodiments.

Network performance device 127 may include an AI/ML system 205, as described herein. AI/ML system 205 may include one or multiple types of models. For example, the models may include a time series model, a forecast model, a clustering model, and/or a classification model. The models may include a tree-based algorithm, a regressive algorithm, and/or another type of AI/ML algorithm or logic, such as Naïve Bayes, K-Nearest Neighbors, decision tree, Random Forest, gradient boosting, support vector machine, clustering via embedding, a dense neural network, a convolutional neural network, a recurrent neural network, and/or the like. AI/ML system 205 may calculate network slice configuration information pertaining to a network slice and/or a geographic area based on various types of information, as described herein. Network provisioning device 129 may also use policies/rules, historical network performance information, network dependency information associated with a network (e.g., access network 105, core network 120, etc.), a network device (e.g., access device 107, core device 122, etc.), a network slice (e.g., 5QIs, etc.), a segment of a network slice, application services, and various network elements, as described herein, to make this determination.

According to an exemplary embodiment, AI/ML system 205 may identify parameters and generate templates that enable the provisioning of network resources and configurations such that expected performance metric/SLA requirements of the network slice may be optimally modified when current analytics information (and other types of information) may underperform or when current analytics information may overperform. The AI/ML logic may compare historical data sets to current network conditions as a basis for selection of a template and associated parameters and values that may be used. In this way, network performance device 127 may include logic that calculates for the provisioning, configuration, and modification of various types of network elements and/or scopes of geographic areas that yields an optimization for configuration of the network slice according to one or multiple network states, geographic areas, domains, time period, network slice request information, and/or other types of criteria, as described herein.

Network 215 may include access network 105, core network 120, external network 115, and/or other types of networks, as described herein. NWDAF 220 may provide a function and/or a service in accordance with a network standard (e.g., 3GPP, 3GPP2, ITU, ETSI, GSMA, and/or the like) and/or of a proprietary nature. For example, NWDAF 220 may collect data from network devices and operations, administration, and maintenance (OAM) systems across one or multiple networks or domains (e.g., core, cloud, etc.) via standard interfaces of a service-based architecture. NWDAF 220 may obtain data (e.g., statistics, metric values, events, etc.) from such devices/networks and may provide data analytics functions that may be configured by a network operator, for example.

Additionally, for example, NWDAF 220 may include logic of an exemplary embodiment of the hybrid network slicing service, as described herein. For example, NWDAF 220 may obtain current state information, which may include current performance metric information, for various types and granularities of network elements, geographic areas, and time periods (e.g., seconds, hour(s), day(s), and/or another time period) across one or multiple networks, geographic service areas, and virtual/logical domains. NWDAF 220 may generate current network analytics information and provide the current analytics information, which may include current performance metric parameters and values, as described herein, to network performance device 127/AI/ML system 205. The current analytics information may include current performance metric parameters and values. The current performance metric value may be implemented as a single value (e.g., X) or a range of values (e.g., X to Y). The current performance metric value may also be associated with a time period, may indicate an average value, a mean value, and/or another statistical value. The current performance metric value may also be associated with a network element and/or a geographic service area, as described herein.

Testing device 230 may be implemented as end device 130. Testing device 230 may be operated or controlled by an entity other than a user/subscriber, such as a network operator/administrator. Testing device 230 may generate data indicative of or pertaining to performance of a network slice, a network element/resource of the network slice, and/or associated with a geographic service area or domain. For example, testing device 230 may perform testing for throughput, latency, and/or another performance metric associated with the network slice. Testing device 230 may generate test traffic and transmit the test traffic via the network slice or a portion thereof. Although not illustrated, network 215 may include testing device 230. For example, testing device 230 in network 215 may be implemented as a network server.

FIGS. 3A-3D are diagrams illustrating an exemplary process 300 of an exemplary embodiment of the hybrid network slicing service. As illustrated, referring to FIG. 3A, according to an exemplary scenario, a user (not illustrated) via end device 130 may provide network slice information 302 to portal device 125. For example, network slice information 302 may specify SLA requirements and other features of a network slice not available and/or offered by the network. For example, the proposed network slice may accommodate a new application (e.g., to be launched or under development), as previously described. Based on the network slice information, portal device 125 may generate a network slice request 304 and transmit network slice request 304 to network performance device 127, as described herein.

According to another exemplary scenario, a user (not illustrated) via end device 130 may transmit network slice information 302 in a message (e.g., as part of an attachment or PDU session establishment procedure). For example, the user may have installed an application, such as a newly available (e.g., to the public, customers, users, subscribers, etc.) application on end device 130, and wishes to, on demand, request from network 215, to configure a network slice that may accommodate performance metric/SLA requirements of the newly available application in which the SLA requirements may be unique relative to currently available network slices offered and/or available by network 215. As an example, network slice information 302 may be relayed to portal device 125 via core device 122 (e.g., an SMF, an AMF, or the like).

As further illustrated, network performance device 127 may receive current analytics data 306 from NWDAF 220. In response, in block 310, AI/ML system 205 may analyze current analytics data 306 and network slice request 304. AI/ML system 205 may determine to configure a network slice based on network slice request 304.

Figure 3A:
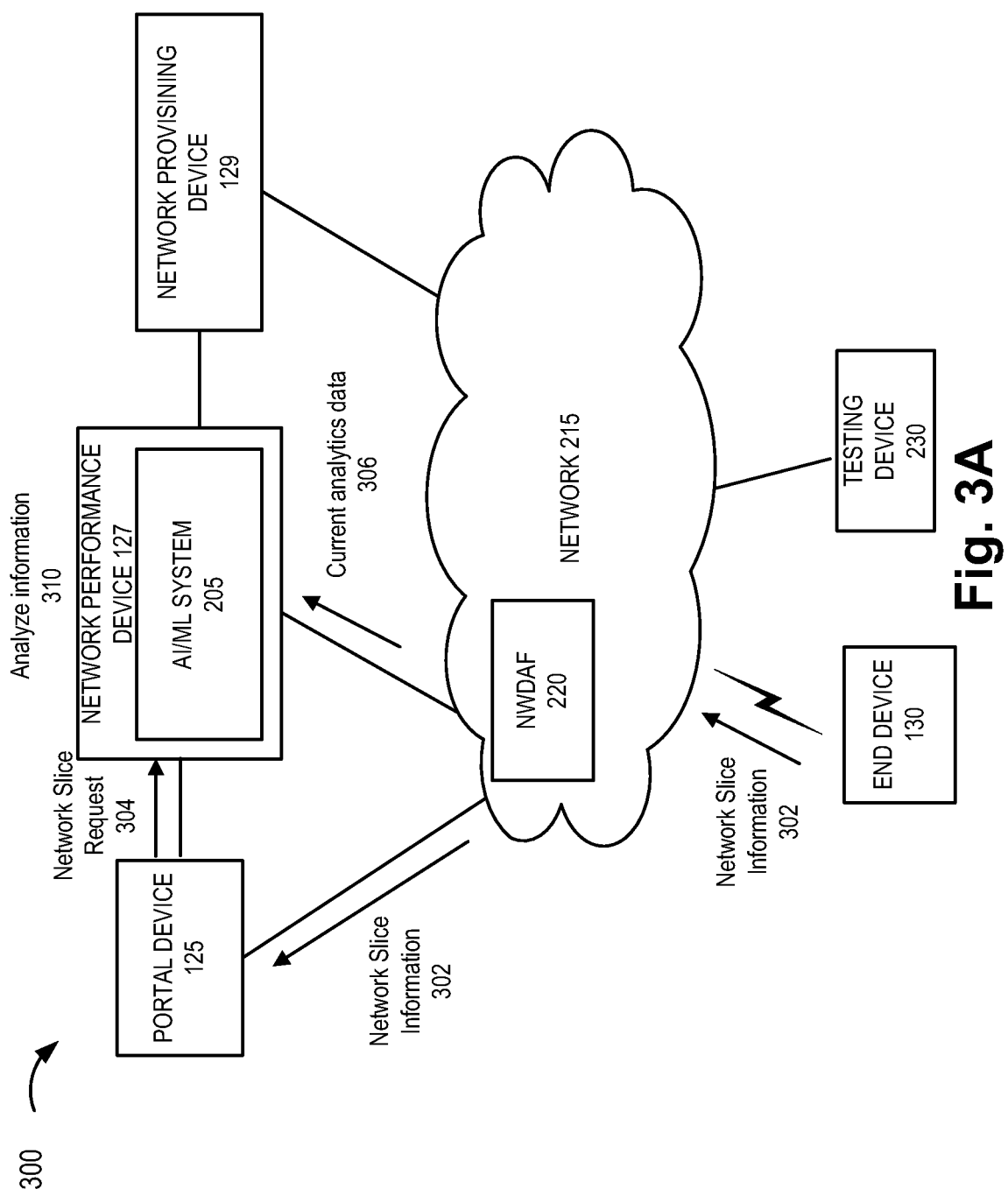
FIGS. 3A-3D are diagrams illustrating an exemplary process of an exemplary embodiment of the hybrid network slicing service.
Figure 3B:
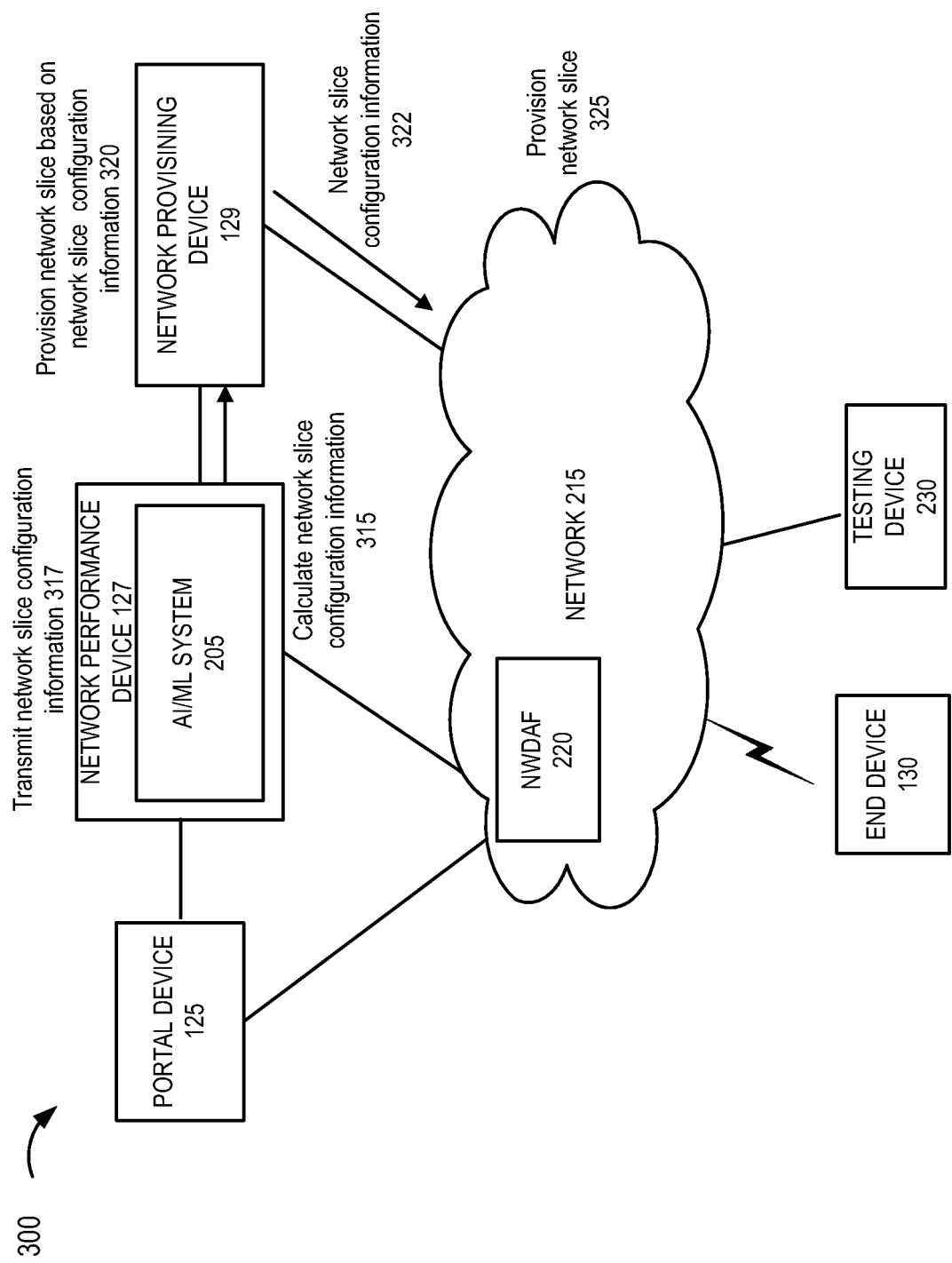

Referring to FIG. 3B, AI/ML system 205 may calculate network slice configuration information 315 based on the obtained data. For example, AI/ML system 205 may evaluate the identifier of the domain and correlated aspects of the proposed network slice, such as network resources that may be used, application and traffic flow characteristics, performance metrics parameters and values, and so forth. AI/ML system 205 may evaluate current network state and analytics information, as well as other information, as described herein.

Network performance device 127 may transmit network slice configuration information 317 to network provisioning device 129. Network provisioning device 129 may provision the network slice based on network slice configuration information 320. For example, network provisioning device 129 may identify the network elements and/or the geographic service area of relevance for provisioning the network slice. Network provisioning device 129 may transmit network slice configuration information 322 to network 215, and network 215 may provision the network slice 325.

Figure 3C:
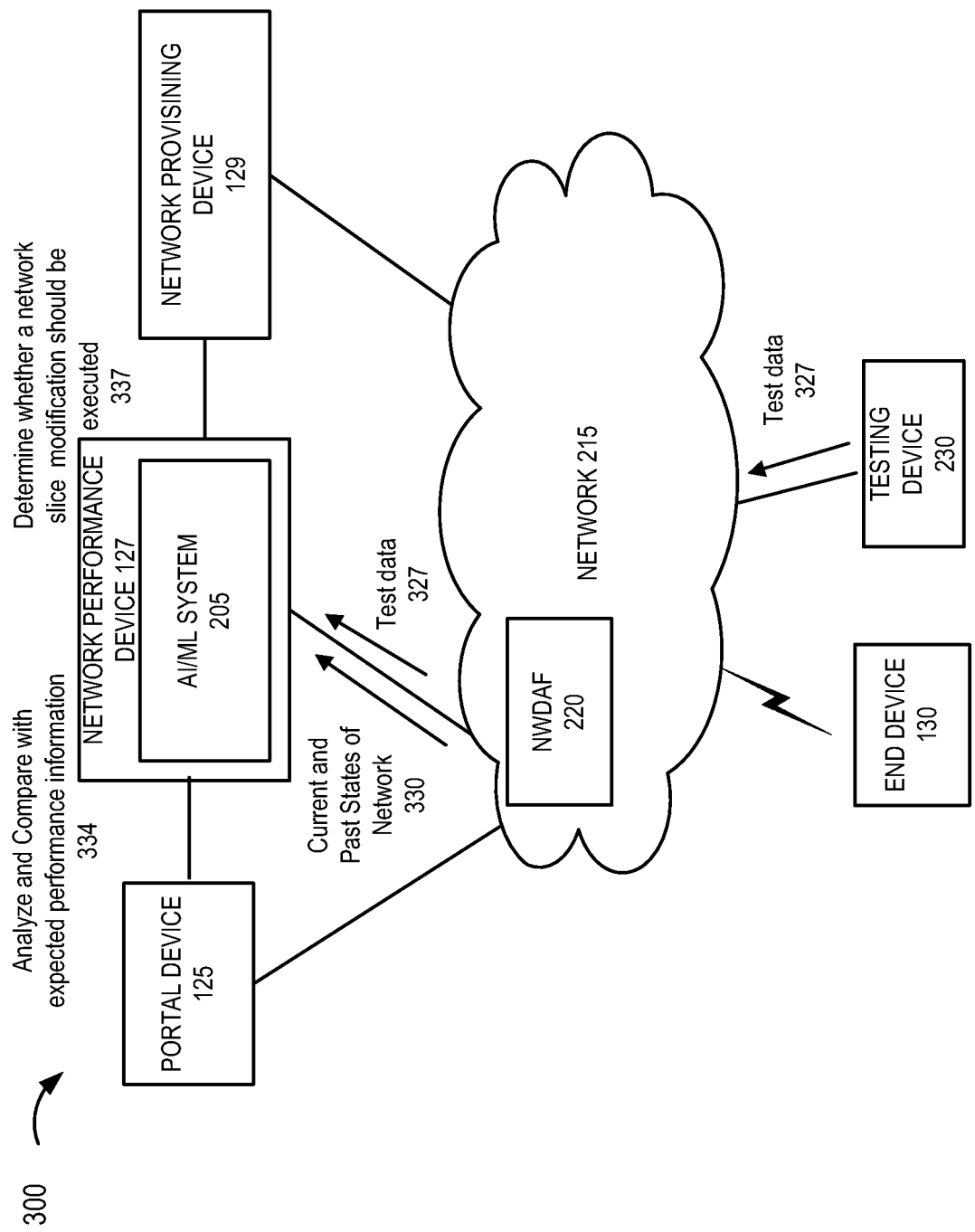

Referring to FIG. 3C, after the provisioning of the network slice, network performance device 127 may receive current and past states of the network 330. According to some exemplary embodiments, network performance device 127 may receive test data 327. For example, network slice configuration information 322 may include information that may configure testing device 230, trigger the generation and/or transmission of test data, provide a network slice identifier for the new network slice, indicate a destination address associated with a network server, and so forth.

Figure 3D:
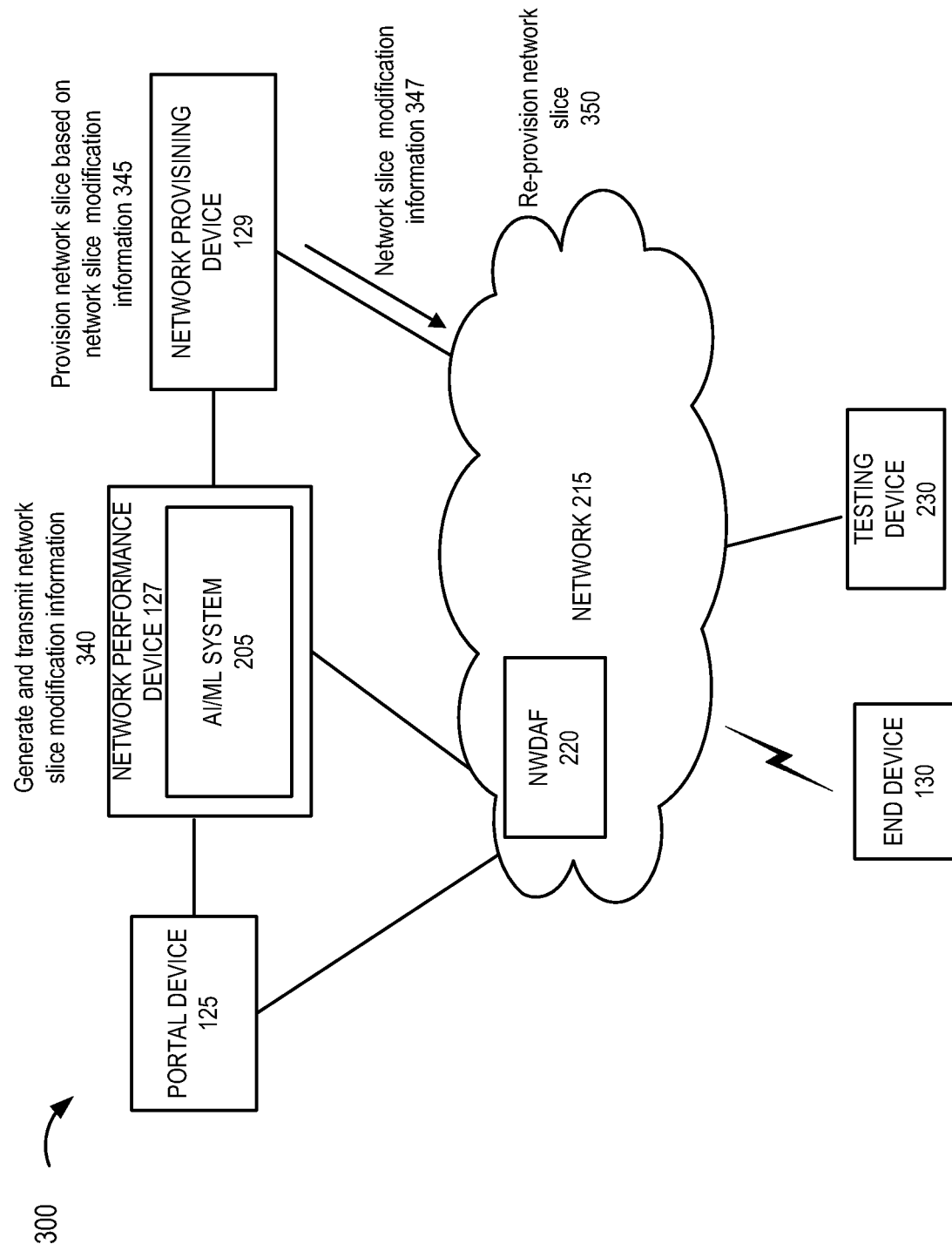

Based on the current analytics data 330 and/or test data 327, AI/ML system 205 may analyze and compare this information to an expected performance information 334, as described herein. Based on a result of the comparison, network performance device 127 may determine whether expected performance metric/SLA requirements associated with the network slice are satisfied or not. As further illustrated, AI/ML system 205 may determine whether a network slice modification should be executed 337. As previously described, AI/ML system 205 may make this determination based on other information and factors, such as policies/rules, historical network performance information, and network dependency information. Referring to FIG. 3D, according to this exemplary scenario, AI/ML system 205 may determine that a network modification should be executed, and in response, generate and transmit network slice modification information 340 to network provisioning device 129. For example, AI/ML system 205 may select a template and associated parameters that may optimally modify network resources and/or configurations such that expected network performance may be prospectively achieved by the network slice.

Network provisioning device 129 may provision the network slice based on the network slice modification information 345. The provisioning may include transmitting network slice modification information 347 to network 215, and network 215 may re-provision the network slice 350.

According to other exemplary embodiments and scenarios, process 300 may include additional operations, fewer operations, and/or different operations that may be performed. For example, network performance device 127 may determine that a network slice modification is not necessary and operations 345 and 350 may not be performed.

FIG. 4 is a diagram illustrating exemplary components of a device 400 that may be included in one or more of the devices described herein. For example, device 400 may correspond to access device 107, external device 117, core device 122, network performance device 127, network provisioning device 129, end device 130, AI/ML system 205, NWDAF 220, testing device 230, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to AI/ML system 205, software 420 may include an application that, when executed by processor 410, provides a function and/or a process of hybrid network slicing service, as described herein. Additionally, for example, with reference to network provisioning device 129, software 420 may include an application that, when executed by processor 410, provides a function and/or a process of hybrid network slicing service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
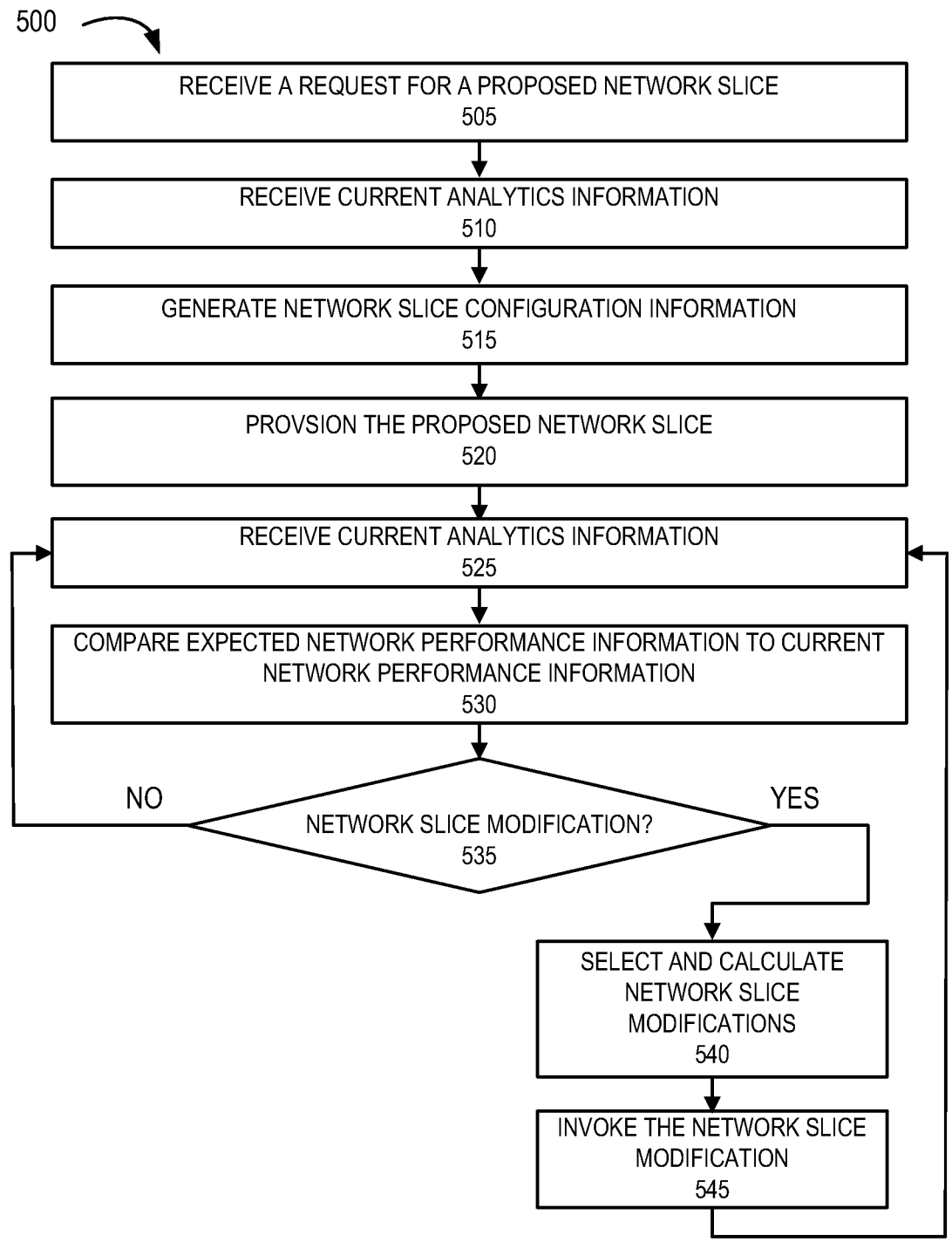
FIG. 5 is a flow diagram illustrating another exemplary process of an exemplary embodiment of the hybrid network slicing service.

FIG. 5 is a flow diagram illustrating an exemplary process 500 of an exemplary embodiment of the hybrid network slicing service. According to an exemplary embodiment, network performance device 127 may perform a step of process 500. According to an exemplary embodiment, network provisioning device 129 may perform a step of process 500. According to an exemplary implementation, processor 410 executes software 420 to perform a step of process 500, as described herein. Alternatively, a step may be performed by execution of only hardware.

In block 505, network performance device 127 may receive a request for a proposed network slice. For example, network performance device 127 may receive a network slice request, which relates to a network slice that is not offered and/or available by a network among the network slices offered by the network and available for use by users/end devices 130, as described herein. The network slice may relate to a new or under-development application and/or service.

In block 510, network performance device 127 may receive current analytics information. For example, the current analytics information may include performance metric parameters and value information and network state information, among other types of information, as described herein.

In block 515, network performance device 127 may generate network slice configuration information for the proposed network slice. For example, AI/ML system 205 may generate the network slice configuration information based on the network slice request, the current analytics and state information, among other types of information, as described herein.

In block 520, network provisioning device 129 may provision the proposed network slice based on the network slice configuration information.

In block 525, network performance device 127 may receive current analytics information. For example, AI/ML system 205 may receive the current analytics and network state information, among other types of information, as described herein, including performance metric information pertaining to the proposed network slice.

In block 530, network performance device 127 may compare an expected network performance information of the proposed network slice to current performance network information. For example, AI/ML system 205 may determine whether the expected network performance of the proposed network slice is satisfied or not based on a result of the comparison.

In block 535, network performance device 127 may determine whether a network modification should be executed. For example, when the current network performance information may satisfy the expected network performance information, AI/ML system 205 may determine to not invoke a network modification (block 535-NO). Process 500 may return to block 525. When the current network performance information may not satisfy the expected performance information, AI/ML system 205 may determine to invoke a network modification (block 535-YES), in which AI/ML system 205 may select and calculate network slice modifications (block 540). For example, AI/ML system 205 may select a network resource and/or a configuration associated with the network slice to modify according to a model.

In block 545, network provisioning device 129 may invoke the network slice modification. For example, network provisioning device 129 may transmit the parameters and/or provision network resources and/or network configurations. The network slice modification may be executed based on the invocation. Process 500 may continue to block 525.

FIG. 5 illustrates an exemplary process of the hybrid network slicing service, according to other exemplary embodiments, the hybrid network slicing service may perform additional operations, fewer operations, and/or different operations than those illustrated and described. For example, AI/ML system 205 may determine when the network slice configuration is satisfactorily learned and/or optimized, and may generate a network slice configuration template indicative of the learned and optimized network slice configuration. AI/ML system 205 may communicate with other network systems for the assignment of network slice assistance information, assignment of a network slice identifier, and so forth. The network slice may be available to users and end devices 130 of a particular domain for use.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device, a network slice request, which includes an identifier that indicates first radio access network and first core network resources associated with a first entity and second radio access network and second core network resources associated with a second entity, for a proposed network slice in a network;
receiving, by the network device, first current network analytics information pertaining to the network;

calculating, by the network device based on the first current network analytics information and the network slice request, a network slice configuration for the proposed network slice; and provisioning, by the network device, the proposed network slice in the network according to the network slice configuration.

2. The method of claim 1, wherein the proposed network slice has not been previously available nor offered by the network.

3. The method of claim 1, wherein the network slice request includes expected network performance parameters and values and wherein at least a portion of the first radio access network and first core network resources are reserved.

4. The method of claim 1, further comprising:

receiving, by the network device after the provisioning, second current network analytics information pertaining to the proposed network slice;

determining, by the network device, that expected network performance parameter values of the proposed network slice are not satisfied based on the second current network analytics information; and modifying, by the network device, the network slice configuration of the proposed network slice.

5. The method of claim 1, wherein the proposed network slice pertains to an end device application or service under development.

6. The method of claim 1, further comprising:

generating, by the network device, a network slice template of the proposed network slice.

7. The method of claim 1, wherein the network slice request is received from a network portal that enables a user to specify expected network performance parameters and values for the proposed network slice.

8. The method of claim 1, further comprising:

invoking, by the network device, transmission of test traffic data via the proposed network slice.

9. A network device comprising:

a processor that is configured to:

receive a network slice request, which includes an identifier that indicates first radio access network and first core network resources associated with a first entity and second radio access network and second core network resources associated with a second entity, for a proposed network slice in a network slice;

receive first current network analytics information pertaining to the network;

calculate, based on the first current network analytics information and the network slice request, a network slice configuration for the proposed network slice; and provision the proposed network slice in the network according to the network slice configuration.

10. The network device of claim 9, wherein the proposed network slice has not been previously available nor offered by the network.

11. The network device of claim 9, wherein the network slice request includes expected network performance parameters and values and wherein at least a portion of the first radio access network and first core network resources are reserved.

12. The network device of claim 9, wherein the processor is further configured to:

receive, after the provisioning, second current network analytics information pertaining to the proposed network slice;

determine that expected network performance parameter values of the proposed network slice are not satisfied based on the second current network analytics information; and modify the network slice configuration of the proposed network slice.

13. The network device of claim 9, wherein the proposed network slice pertains to an end device application or service under development.

14. The network device of claim 9, wherein the processor is further configured to:

generate a network slice template of the proposed network slice.

15. The network device of claim 9, wherein the network slice request is received from a network portal that enables a user to specify expected network performance parameters and values for the proposed network slice.

16. The network device of claim 9, wherein the processor is further configured to:

invoke transmission of test traffic data via the proposed network slice.

17. A non-transitory computer-readable storage medium storing instructions executable by a processor of a network device, wherein the instructions are configured to:

receive a network slice request, which includes an identifier that indicates first radio access network and first core network resources associated with a first entity and second radio access network and second core network resources associated with a second entity, for a proposed network slice in a network;

receive first current network analytics information pertaining to the network;

calculate, based on the first current network analytics information and the network slice request, a network slice configuration for the proposed network slice; and provision the proposed network slice in the network according to the network slice configuration.

18. The non-transitory computer-readable storage medium of claim 17, wherein the proposed network slice has not been previously available nor offered by the network.

19. The non-transitory computer-readable storage medium of claim 17, wherein the network slice request is received from a network portal that enables a user to specify expected network performance parameters and values for the proposed network slice.

20. The non-transitory computer-readable storage medium of claim 17, wherein the instructions are further configured to:

generate a network slice template of the proposed network slice.

* * * * *